United States Patent [19]

Binder et al.

[11] Patent Number: 5,384,217
[45] Date of Patent: Jan. 24, 1995

[54] BATTERY PLATES HAVING ROUNDED LOWER CORNERS

[75] Inventors: Richard R. W. Binder, Menomonee Falls; Daniel J. Cantillon, Sussex; Jeffrey J. Schneider, Waukesha, all of Wis.

[73] Assignee: Globe-Union Inc., Milwaukee, Wis.

[21] Appl. No.: 909,247

[22] Filed: Jul. 6, 1992

[51] Int. Cl.$^6$ .................... H01M 4/72; H01M 2/18; H01M 4/73; H01M 2/14; H01M 4/18; H01M 2/02
[52] U.S. Cl. .................... 429/225; 429/211; 429/246; 429/234
[58] Field of Search ................ 429/246, 225

[56] References Cited

U.S. PATENT DOCUMENTS

| | | | |
|---|---|---|---|
| 487,834 | 12/1892 | Griscom | 429/241 X |
| 669,085 | 3/1901 | Heidel | 429/211 |
| 1,600,083 | 9/1926 | Webster | 429/211 X |
| 1,947,473 | 2/1934 | Huebner | 429/211 |
| 2,727,079 | 12/1952 | Chubb et al. | 429/246 X |
| 3,466,193 | 9/1969 | Hughel | 429/234 |
| 3,923,545 | 12/1975 | Margulies et al. | 136/36 |
| 4,022,951 | 5/1977 | McDowall | 429/246 X |
| 4,118,553 | 10/1978 | Buckethal et al. | 429/234 |
| 4,221,852 | 9/1980 | Qureshi | 429/211 |
| 4,320,183 | 3/1982 | Qureshi | 429/211 |
| 4,327,163 | 4/1982 | Wheadon | 429/139 |
| 4,477,546 | 10/1984 | Wheeler et al. | 429/211 |
| 4,548,882 | 10/1985 | Shima et al. | 429/211 |
| 4,555,459 | 11/1985 | Anderson et al. | 429/211 |
| 4,882,828 | 11/1989 | McLoughlin et al. | 429/246 X |
| 5,149,605 | 9/1992 | Dougherty | 429/160 |

FOREIGN PATENT DOCUMENTS 0029788  6/1981  European Pat. Off. ............ 429/246

Primary Examiner—Floyd D. Higel
Attorney, Agent, or Firm—Foley & Lardner

[57] ABSTRACT

A process for cutting a moving strip to form a series of plates, such as battery plates, includes the initial step of transporting the strip past a rotary divider including a cutter having radial blades configured to cut the strip into the plates. The cutter further has a set of blades for cutting individual pieces from the strip, which pieces are not part of the plates. As the cutter blades cut the strip to form the plates and pieces, a vacuum system applies suction to draw the pieces cut from the strip inwardly into the cutter through holes in the cutter, and then out of the cutter. The holes are each located adjacent each one of the corresponding blades and are shaped and positioned to permit the cut-away piece to pass through. In a preferred embodiment, the vacuum system includes a pair of vacuum manifolds that apply suction at opposite ends of the cylindrical cutter. An apparatus for carrying out the foregoing process accordingly includes a rotary divider as described above provided with a vacuum system. Battery plates made according to the foregoing process are improved in that the two lower corners have a rounded shape lacking a sharp edge which tends to tear an adjacent separator. Such a plate may be inserted bottom end first into a separator envelope to form a plate element for use in a lead-acid battery.

9 Claims, 4 Drawing Sheets

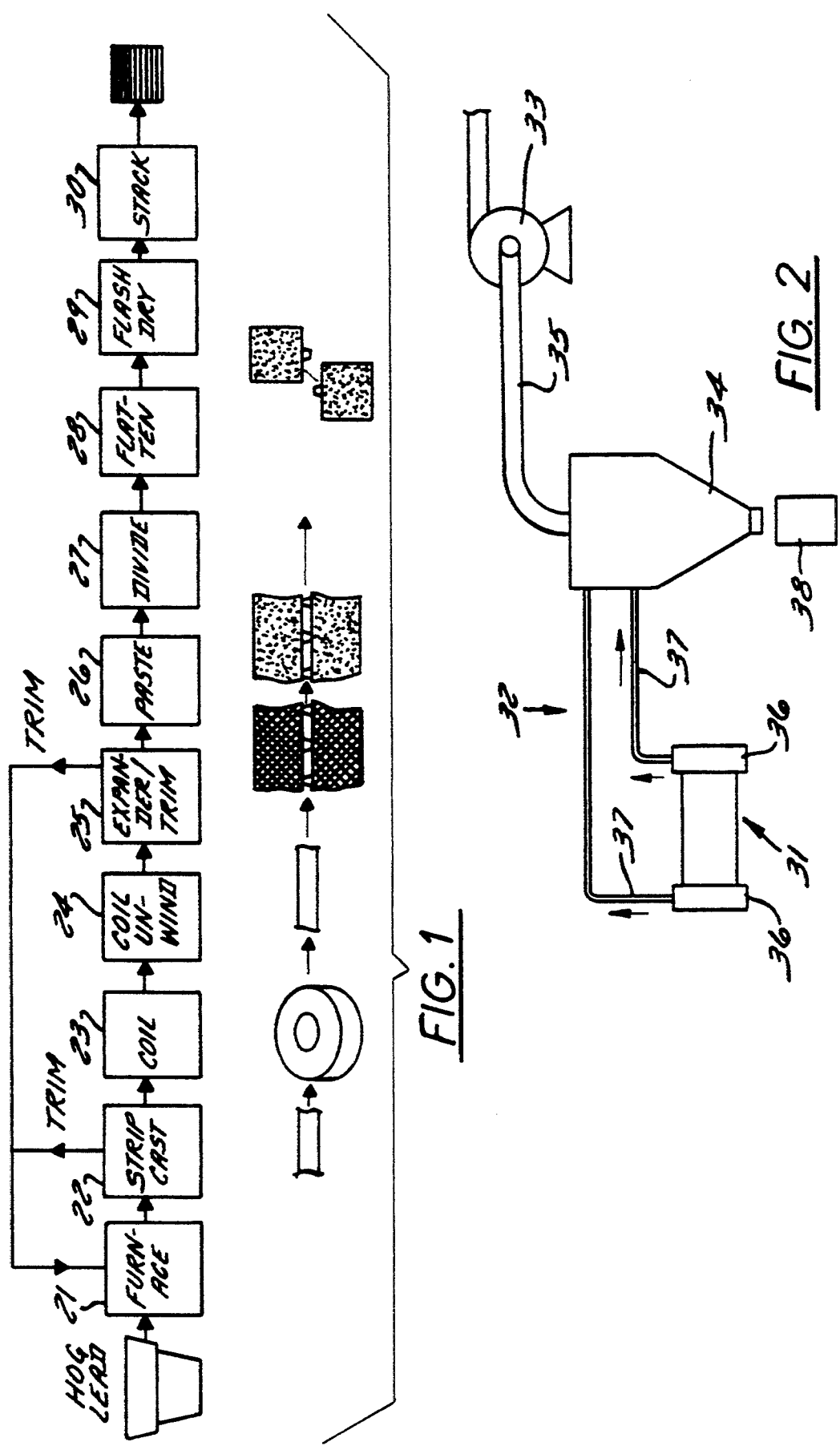

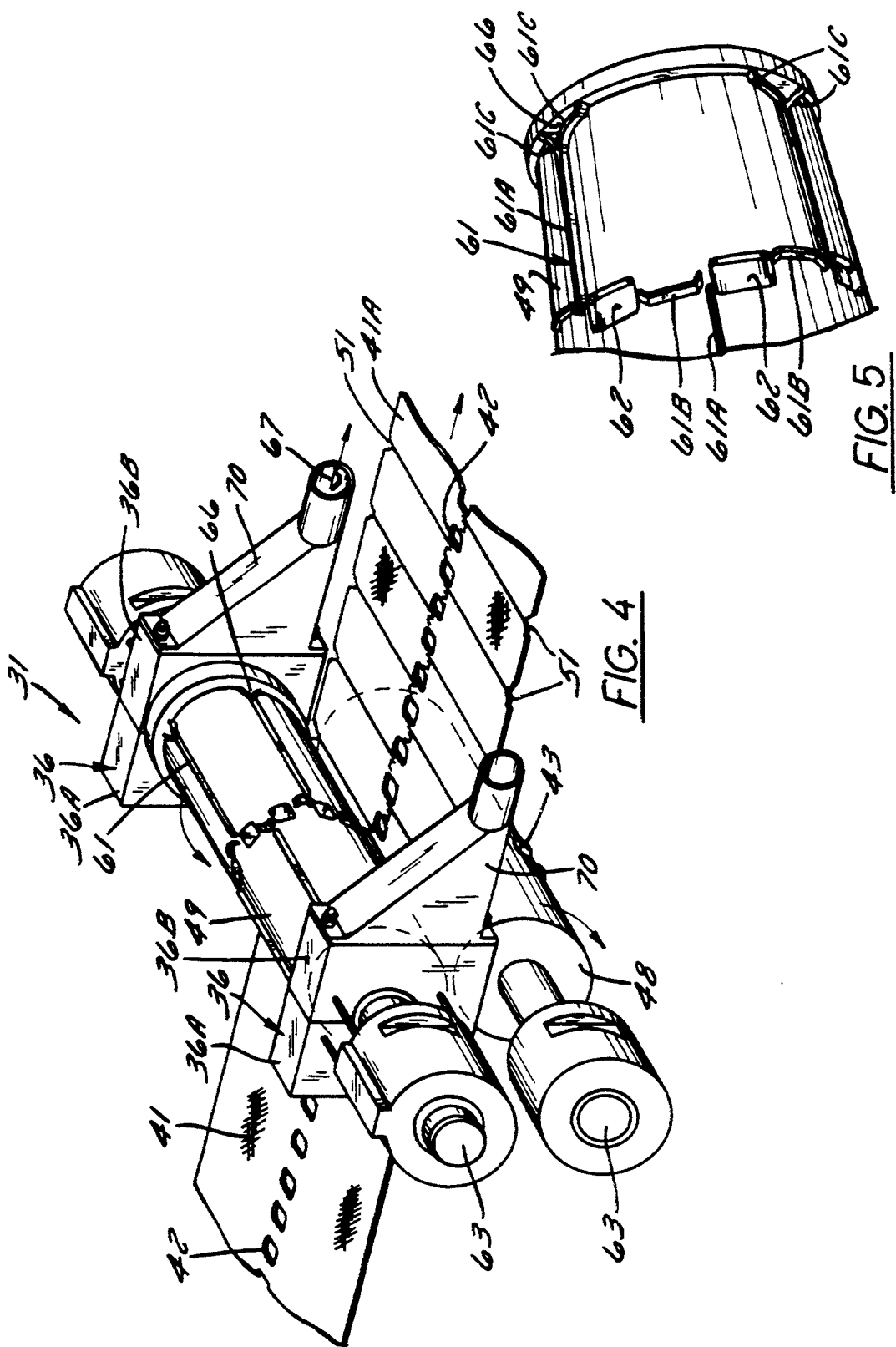

BATTERY PLATES HAVING ROUNDED LOWER CORNERS

TECHNICAL FIELD

The present invention relates to the manufacture of plates from a moving strip by cutting the strip, particularly to the manufacture of battery plates for use in lead-acid batteries.

BACKGROUND OF THE INVENTION

A plate for a lead-acid battery is conventionally made by applying a battery paste to a conductive support such as a lead alloy grid. The paste is made from lead oxide, sulfuric acid and water. The lead oxide reacts with the sulfuric acid to form mono-, tri- or tetrabasic lead sulfate(s). Dry additives such as fiber and expander may be added. The mixture is then dried and water is re-added to form a paste of the desired consistency. The paste is applied to the lead grid, and the pasted plates are then flash-dried and cured at an elevated temperature and humidity to oxidize free lead and adjust the crystal structure of the plate. After curing, the plates are assembled into batteries and electrochemically formed by passage of current to convert the lead sulfate or basic lead sulfate(s) to lead dioxide, thereby forming the active lead material.

The lead alloy grid is made in a multistage process in which molten lead alloy is cast to form a strip. The strip is expanded to form mesh elements for grids, and the paste is then applied. Liner papers are applied to the surfaces of freshly pasted plates during the pasting operation to facilitate handling and stacking. Individual plates are formed by passing the pasted strip through a rotary divider that cuts the outlines of the individual plates on the moving strip. To ensure proper registration for cutting, the strip is formed during expansion with a series of regularly spaced central recesses that are engaged by lugs of a drive roller associated with the divider. The cut plates are then flattened, flash-dried, and stacked for later use in lead-acid battery manufacture.

The battery grids each take the form of a generally rectangular frame supporting a mesh of grid elements onto which the paste is applied. The frame has a pair of upper corners and a pair of lower corners, and an electrically conductive tab extending from a location between the two upper corners. In one common battery design, every other plate in the battery stack is inserted into an envelope made of a separator material such as submicro polyethylene. The sides of the envelope act as separators between the plate in the envelope and the two adjoining plates in the battery stack.

In assembling a battery of this kind, it is necessary to insert the battery plate bottom-first into the open end of the envelope so that the conductive tab at the top of the plate extends out of the envelope. However, the bottom corners on the battery plates are sharp, and will snag and tear the separator material between the positive and negative plates, causing an electrical short within the battery and reducing battery life. Bending or vibration of the plate disposed in the envelope during assembly or use can also cause tearing, and the problem is not confined to envelope-style separators.

Use of battery plates with rounded bottom corners would eliminate the snag and tearing of separators, but no practical process has been proposed for producing rounded corners on such battery plates. In particular, any process wherein the rotary divider cuts off corners results in small pieces of trim (scrap) that are severed from the strip. These pieces, if left on the strip after cutting, can come loose and cause cutting die failure on the divider and can lead to battery failure if the pieces are carried over and inadvertently incorporated into the finished battery. The present invention addresses these problems by providing a system for cutting the rounded corners and then removing the pieces during continuous plate manufacture.

SUMMARY OF THE INVENTION

A process for cutting a moving strip to form a series of plates, such as battery plates, initially involves transporting the strip past a divider having a rotary cutter with a first set of blades extending radially therefrom configured to cut the strip into the plates, and a second set of radial blades for cutting individual pieces from the strip. As the blades cut the strip to form the plates and pieces, a vacuum system applies suction to draw the pieces cut from the strip inwardly into the cutter through holes in the cutter, and then out of the cutter. The holes are each located adjacent one of the corresponding cutter blades of the second set and are shaped and positioned to permit the cut-away piece to pass through. In a preferred embodiment, the vacuum system includes a pair of vacuum manifolds that apply suction at opposite ends of the cylindrical cutter.

An apparatus for carrying out the foregoing process accordingly includes a rotary divider having a cylindrical cutter configured to cut the strip into the plates, including a second set of blades for cutting individual pieces from the strip as described above, and a vacuum system that applies suction to draw the pieces cut from the strip inwardly into the cutter through the holes in the cutter, and then out of the cutter.

According to a further aspect of the invention, a conventional battery plate as described above is improved in that the two lower corners have a rounded shape lacking a sharp edge which would tend to tear an adjacent separator. Such a plate may be inserted bottom end first into a separator envelope to form a plate element for use in a lead-acid battery.

BRIEF DESCRIPTION OF THE DRAWINGS

The invention will be described with reference to the accompanying drawings, wherein like numerals denote like elements, and:

FIG. 1 is a schematic diagram of an overall process for making battery plates in which the process of the invention is included, with the shape of the strip at each stage shown below;

FIG. 2 is a schematic diagram of a vacuum system used with a divider according to the invention;

FIG. 4 is a perspective view of a divider apparatus according to the invention;

FIG. 5 is a partial perspective view of the cylindrical cutter shown in FIG. 4;

DETAILED DESCRIPTION OF PREFERRED EMBODIMENTS

Figure 3:
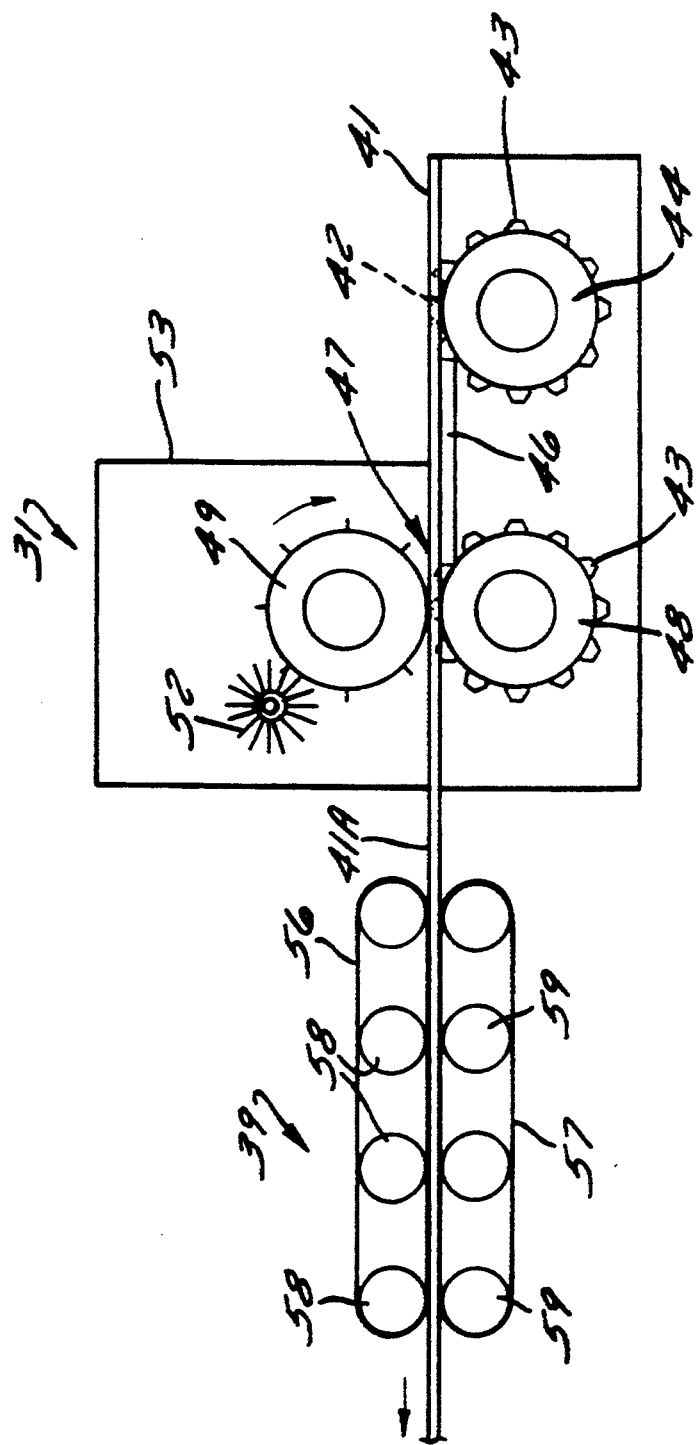
FIG. 3 is a schematic side view of the divider and flattener apparatus used in the process of FIG. 1.

Referring to FIG. 1, the process according to the invention is shown in relation to the other steps conventionally used in a continuous process for making lead-acid battery plates. The known process for making such plates includes an initial step 21 of melting hog lead in a furnace, followed by a step 22 of feeding molten lead alloy to a strip caster. Trim from the caster is recycled to the furnace. The strip is coiled (23) on a winder, and coils of lead alloy strip are stored for later use.

To form a battery grid, the coil is unwound (24) and the free end is fed through an expander that cuts, slits and stretches (25) the strip to form a mesh-like pattern of grid elements. See, for example, the expanders described in U.S. Pat. Nos. 4,315,356 and 4,291,443 assigned to Cominco Ltd., the contents of which are incorporated herein by reference. Trim from the expander is recycled to the furnace. The expanded strip is then pasted (26) by a conventional paster, and then fed to the divider according to the invention, wherein the strip is cut (27). Plates cut from the strip are then flattened (28), then passed on a conveyer through an oven for flash-drying (29), and then stacked (30) for later use. Flash drying is performed using an open gas flame or an oven, for example, as a 10–15 second drying of the plates in a conventional blast drying oven at 260° C. (500° F.).

A shown in FIG. 2, a rotary divider 31 used in the cutting step has a vacuum system 32 associated therewith. Divider 31 cuts the moving strip into plates and, at the same time, cuts rounded corners as explained in detail below. Each pair of corners cut results in a small, roughly triangular piece of trim (scrap metal.) Vacuum system 32 includes a cyclone blower 33 connected to a cyclone 34 by a conduit 35. Cyclone 34 is in turn connected to a pair of manifolds 36 disposed at opposite ends of divider 31 through a pair of hoses or pipes 37. The trimmed pieces from divider 31 enter manifolds 37 and pass through hoses 37 into cyclone 34. The pieces then fall out of the bottom of cyclone 34 into a barrel 38. The contents of barrel 38 may be periodically recycled to a smelter.

Referring now to FIGS. 3 and 4, the divider 31 is located immediately ahead of a flattener 39. A pasted strip 41 has a series of regularly spaced holes 42 which are engaged by lugs or dogs 43 of an optional first drive roller 44. Roller 44 may comprise a series of spaced, coaxial disks of equal diameter that receive strip 41 from the paster, with lugs 43 being on the center disk. Strip 41 then moves over several spaced, parallel support rails 46 into a nip 47 between a second drive roller 48 and a cylindrical cutter 49.

Cutter 49 simultaneously cuts strip 41 into two rows of battery plates 41A having rounded outside (bottom) corners 51. A freely-rotatable rotary brush 52, for example, a 2-inch diameter nylon brush, contacts the cylindrical outer surface of cutter 49 tangentially, preferably from end to end, cleaning it and aiding in forcing the trim pieces into the interior of cutter 49. All of rolls 44, 48 and 49 are driven by a suitable drive system 53 such as an electric motor provided with a gear linkage (not shown) that ensures that rolls 44, 48 and 49 rotate together at the same speed.

Flattener 39 includes pair of upper and lower conveyer belts 56, 57 wound over a series of spaced pairs of upper and lower rollers 58, 59 and spaced apart by a distance approximately equal to the plate thickness, e.g., 0.04 inch. The plates 41A are fed between belts 56, 57. The action of rollers 58, 59 flattens out any raised edges which may have formed during cutting. Rollers 58, 59 have an associated drive system but need not be biased to exert extra pressure on plates 41A.

Figure 6:
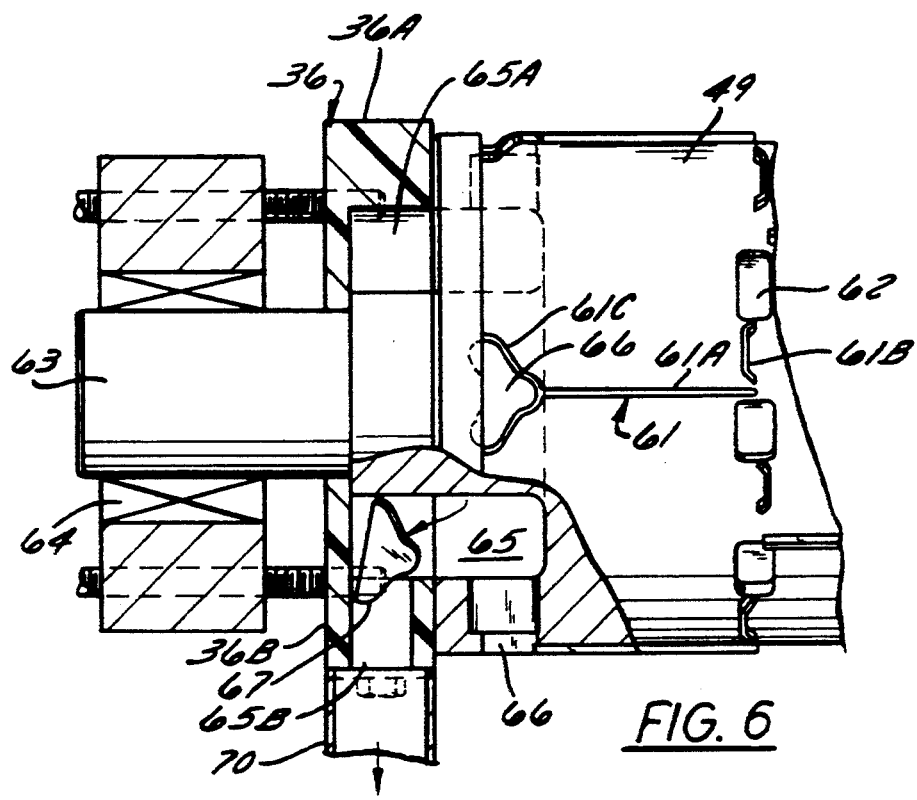
FIG. 6 is partial front view, partly in section, of the left end of the divider shown in FIG. 4.

FIGS. 4 to 6 illustrate the divider 31 in detail. Rotary cutter 49, which is preferably a cylindrical drum, has a plurality of cutter blades 61 projecting radially from its cylindrical surface in a repetitive pattern that forms two offset rows of plates 41A. Blades 61 include lengthwise blades 61A that form the sides of each plate 41A, central transverse blades 61B for forming the tab on each plate, and rounded blades 61C for forming the rounded lower corners of each plate. Blades 61B alternate with a row of central recesses 62 that mate with lugs 43 of drive roller 48, and blades 61B alternately face in opposite directions to produce two rows of plates 41A from a single strip as shown. Blades 61A extend from one end of a blade 61B alternately in offset positions towards each end of the roll, at which point each blade splits into a pair of curved, symmetrical blades 61C. Each pair of blades 61C cuts off a roughly triangular piece from strip 41 to form a pair of rounded corners 51.

Rotary cutter 49 has a pair of axles 63 projecting from its ends rotatably supported by a pair of bearings 64; drive roller (cutting anvil) 48 is similarly supported. Cutter 49 further has a pair of annular recesses 65 in each end. Each recess 65 communicates with a series of spaced radial holes 66 each formed adjacent to and outwardly of an associated pair of cutter blades 61C. Holes 66 are large than the pieces trimmed by the blades 61C.

The vacuum manifolds 36 are mounted in contact with the rotating ends of cutter 49 covering each recess 65. Each manifold comprises a pair of mating sections 36A, 36B which are secured together by any appropriate means, such as screws or other fasteners, on opposite sides of each axle 63. Sections 36A, 36B have semicircular cutaway portions which form a manifold chamber 65A in communication with recess 65. An outlet opening 65B in one section 36B allows cut-away corner pieces 67 to pass through a manifold extension 70 having a gradually reduced width, and then into hose 37, which is coupled to extension 70. For purposes of removing corner pieces 67 from lead-acid SLI battery plates of conventional size, a minimum vacuum of about 9 inches of water is needed. If the process line is operating at a speed higher than about 100–130 feet/minute, a stronger vacuum may be needed.

In operation, cutter 49 rotates to continuously cut plates 41A as described above. Triangular trim pieces 67 are cut away from strip 41 by rounded blades 61C. These pieces 67 are drawn inwardly through holes 66 by the suction applied by vacuum system 32 through manifolds 36. If the suction is not sufficient to make each piece 67 fall in, brush 52 contacts pieces 67 and presses them inwardly in combination with the force of the suction. Pieces 67 enter annular recess 65 and the associated manifold 36, after which they travel to barrel 38 via manifold chamber 65A, outlet 65B, manifold extension 70, hose 37 and cyclone 34, as described above.

Figure 7:
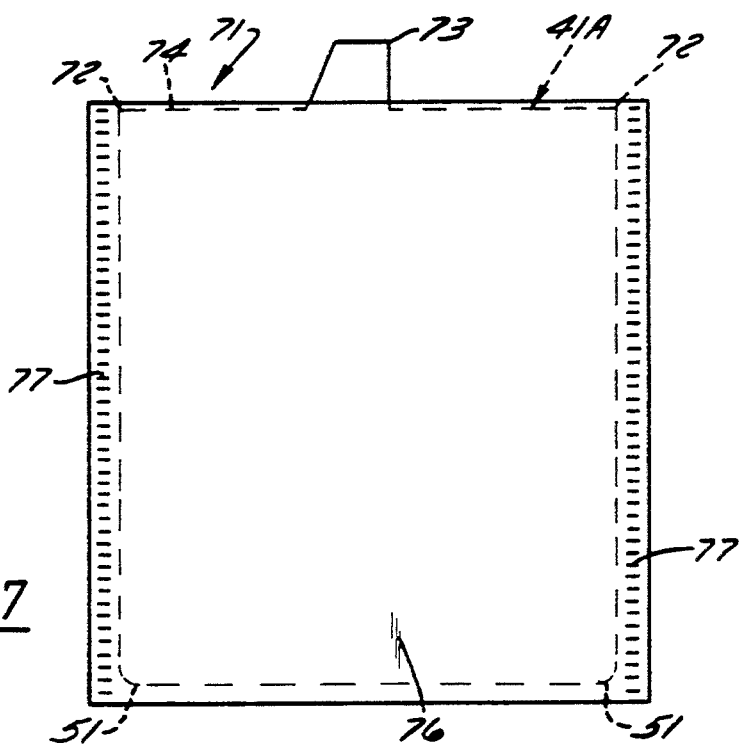
FIG. 7 is a front view of a battery plate element according to the invention, with the concealed portion of the plate shown in phantom.

FIG. 7 illustrates a plate element 71 according to the invention including a pasted plate 41A having rounded bottom corners 51, square top corners 72, and a conductive tab 73 extending from between the top corners 72. The grid itself includes a generally rectangular outer frame 74 and a mesh of grid elements 75 (see FIG. 1) spanning frame 74 which are covered by the battery paste. Many different grid designs are well-known in the art. Each plate 41A is disposed in a conventional submicro polyethylene separator envelope 76. Envelope 76 is formed from a single piece of material which is folded in half and secured at the edges, for example, with crimped edges 77. During insertion or re-insertion of plate 41A into envelope 76, such as during the strap forming operation, rounded corners 51 prevent tearing of envelope 76.

It will be understood that the foregoing description is of preferred exemplary embodiments of the invention, and that the invention is not limited to the specific forms shown. For example, the process and apparatus according to the invention could be used to manufacture virtually any type of plate, and are not limited to the manufacture of battery plates. The holes, blades and recesses of the cutter could be rearranged to cut away small pieces at locations other than the bottom corners as disclosed. These and other modifications may be made in the design and arrangement of the elements without departing from the scope of the invention as expressed in the appended claims.

We claim:

1. In a battery plate for use in a lead-acid battery, the plate comprising a conductive grid covered with an active lead material, the grid comprising a generally rectangular outer frame having a pair of sides, a top and a bottom spanned by grid elements forming a mesh, the frame having a pair of upper corners, a pair of lower corners, and an electrically conductive tab extending from a location on the top of the frame between the two upper corners, the improvement which comprises:

the plate has been formed by expanding a strip of lead alloy, and the two upper corners are square and the two lower corners have a rounded shape lacking a sharp edge which would tend to cut an adjacent separator element, and the sides of the frame are substantially straight and free of projections.

2. A plate element for use in a lead-acid battery, comprising:

a separator envelope joined along its sides and bottom end and having an open upper end; and a battery plate comprising a conductive grid formed by expanding a strip of lead alloy and having an active lead material applied thereto, which plate is inserted into the separator envelope bottom end first, wherein the grid comprises a generally rectangular outer frame having a pair of sides, a top and a bottom spanned by grid elements forming a mesh, the frame having a pair of upper corners and a pair of lower corners, with an electrically conductive tab extending from a location on the top of the frame, the plate being substantially completely inserted into and covered by the envelope except for the tab, which extends out of the open upper end of the envelope, and the two lower corners of the plate have a rounded shape lacking a sharp edge which would tend to cut the separator envelope.

3. The plate of claim 1, wherein the tab extends from a location between and spaced from the two upper corners.

4. The plate element of claim 2, wherein the upper corners of the frame are square.

5. The plate element of claim 4, wherein the sides of the frame are substantially straight and free of projections.

6. The plate element of claim 2, wherein the separator envelope has substantially the same shape as the frame and is sealed along its bottom and sides so that the frame fits closely therein with the tab projecting out of the open upper end of the separator envelope.

7. The plate element of claim 6, wherein the separator envelope consists essentially of polyethylene.

8. The plate element of claim 7, wherein the separator envelope consists essentially of a single piece of polyethylene folded in half along a bottom edge thereof and crimped along its sides.

9. The plate element of claim 4, wherein the tab extends from a location between and spaced from the two upper corners.

* * * * *